United States Patent [19]

Weber et al.

[11] Patent Number: 5,486,398

[45] Date of Patent: Jan. 23, 1996

[54] LOW FLAMMABILITY CARPET FLOOR COVERING

[75] Inventors: Manfred Weber, Glashütten; Gerhard Schwarz, Hanau, both of Germany

[73] Assignee: Hoechst Aktiengesellschaft

[21] Appl. No.: 127,644

[22] Filed: Sep. 28, 1993

[30] Foreign Application Priority Data

Sep. 30, 1992 [DE] Germany .............................. 9212981 U
Jun. 18, 1993 [DE] Germany .............................. 9309105 U

[51] Int. Cl.⁶ ............................ B32B 33/00; D03D 27/00
[52] U.S. Cl. ................................................................ 428/95
[58] Field of Search .................................................. 428/95

[56] References Cited

U.S. PATENT DOCUMENTS

| 4,975,514 | 12/1990 | Watanabe et al. | 528/66 |
| 4,978,708 | 12/1990 | Fowler et al. | 524/507 |

FOREIGN PATENT DOCUMENTS

| 0006174 | 1/1980 | European Pat. Off. . |
| 00206217 | 12/1986 | European Pat. Off. . |
| 0204938 | 12/1986 | European Pat. Off. . |
| 2369815 | 6/1978 | France . |
| 7907356 U | 7/1979 | Germany . |
| 7907356 | 7/1979 | Germany . |
| 1573778 | 8/1980 | United Kingdom . |

*Primary Examiner*—Thomas Hamilton, III
*Attorney, Agent, or Firm*—Connolly & Hutz

[57] ABSTRACT

There is described a low flammability carpet floor covering comprising a backing material, a tied-in pile yarn, and a back finish, wherein the pile yarn comprises low flammability synthetic fibers, the backing material comprises normal or low flammability synthetic fibers, and the back finish comprises a polyurethane composed of the radicals of the formulae I to VII:

—CO—A1—CO—     (I)

—CO—A2—CO—     (II)

(—O—)ₙ—A3—(COOH)ₘ     (III)

—O—B1—O—     (IV)

—O—B2—(O—)ₚ     (V)

—NH—C1—NH—     (VI)

—CO—NH—D1—NH—CO—     (VII)

where the proportions of the radicals I to III, based on their total amount, are within the following limits:

I: 40 to 80 mol %,

II: 10 to 40 mol %,

III: 0 to 25 mol %, the proportions of the radicals IV, V and VI, based on their total amount, are within the following limits:

IV: 65 to 95 mol %,

V: 0 to 19 mol %,

VI: 3 to 16 mol %, the radicals of the formulae I, II and IV are polyester blocks having an average molecular weight of from 400 to 6000 and the proportions of the radicals of the formula VII, based on the total amount of all the components of the polyurethane resin, are from 5 to 35 mol %, preferably from 10 to 25 mol %, and a process for producing the low flammability carpet floor covering.

There is further described an aqueous composition comprising this polyurethane resin and the use thereof for textile finishing.

10 Claims, 1 Drawing Sheet

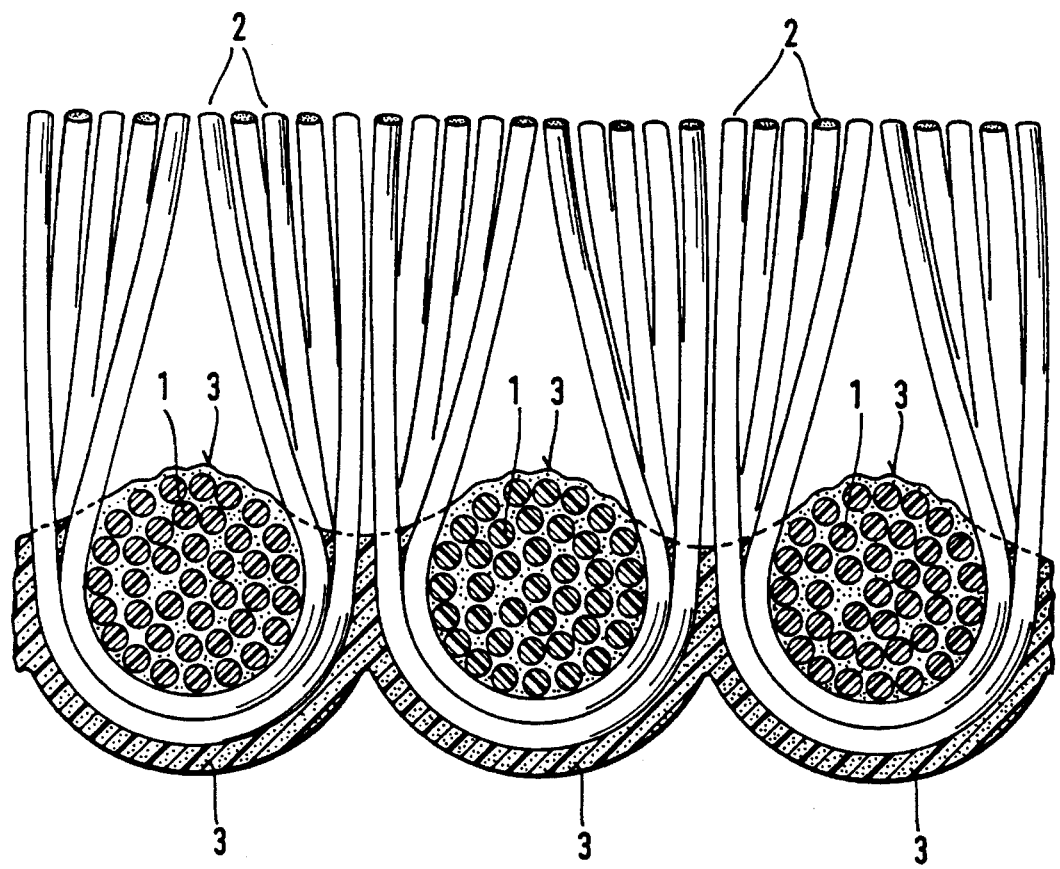

LOW FLAMMABILITY CARPET FLOOR COVERING

The present invention relates to a low flammability carpet floor covering comprising a backing, a tied-in pile yarn and a back finish, wherein the pile yarn comprises low flammability synthetic fibers, the backing comprises normal or low flammability synthetic fibers and the back finish comprises a polyurethane.

Carpets for the purposes of the present invention are textile sheet materials produced in various ways by hand or machine which consist of a backing—also called a base or ground fabric—and a pile layer, which is important for the use, and are predominantly used as floor covering. The backing of a carpet is a web-, weave- or knit-like sheet material, into which are tied tufts or loops of pile yarns which stand upright from the plane of the backing material on one side thereof. The manner of production and the resulting differences in the tying of the pile yarns into the backing is the basis for distinguishing various kinds of carpet, for example knotted carpets, which can be produced manually or mechanically, hand- or machine-woven carpets, knitted carpets, for example Raschel or warp-knitted carpets, and, in particular in the case of needlefelt backings, tufted carpets. Common to all these carpet constructions is that the pile threads are tied into the backing, or ground, and pass through it, i.e. that the pile yarns are somehow interlaced with the yarns of the backing in a manner dictated by the carpetmaking process. It is true that this tying of the pile yarns into the backing leads to some attachment of the pile material to the backing, but is in general not sufficient to confer on the carpet floor covering the stability required for sustained use, in particular tuft anchorage, i.e. the resistance of the pile yarns to pulling out of the backing. It is therefore customary to impregnate and/or coat said carpet materials from the back in order that the use characteristics of the carpet, in particular the tuft anchorage, but also the carpet hand, may be adapted to the requirements of sustained use and to user expectations.

Carpet floor coverings are increasingly used for fitting out spaces which are subject to particularly high fire protection requirements. These include in particular the interiors of public amenities, hotels, in particular from the 9th floor onward, and public means of transport, such as high speed trains, passenger ships and in particular airplanes. The flame resistance of carpet materials therefore has to meet increasingly higher expectations, not only on the part of the consumer but also those already reflected in the legislation. These expectations are not adequately fulfilled by conventional carpet materials. Especially carpet materials for use in airplanes have to meet the requirements of the Boeing test (Federal Register Vol. 37, No. 37, (Title 14—Aeronautics and Space) page 52), which are tougher than the requirements of DIN 4102. These tougher requirements of the Boeing test are not achieved for example by polyamide carpets which meet the DIN 4102 requirements of low flammability building materials of Class B1.

It is true that the Boeing test is passed by wool carpets which have been given a special flameproof finish. However, a serious disadvantage of these carpets is that 1. the finish is removed by shampooing, i.e. the flammability goes up every time the carpet is cleaned, and
2. the flameproof finish accounts for a high proportion of the weight of the carpet. The increased weight of the carpet due to the finish is especially disadvantageous for use in airplane construction.
3. The wool finish contains environmentally harmful heavy metal (zirconium) and leads to water pollution and disposal problems.

German Utility Model No. 79 07 356 discloses a tufted carpet consisting of pile material, a polyester tufting base and back coating, wherein, to achieve flame-resistant properties, the fibers and/or threads of the polyester tufting base contain flame retardants and preferably the pile material and the backing too are flame-proofed. The pile material, i.e. the pile yarn, can consist for example of low flammability polyester fibers, modacrylic fibers or wool. The flame retardants in the low flammability polyester fibers used there have chain members, cocondensed into the polyester chain of the polyester raw material, of the structural formula VIII

where R is a saturated, open-chain or cyclic alkylene, arylene or aralkylene radical and $R^1$ is an alkyl radical having up to 6 carbon atoms, or an aryl or aralkylene radical.

The back coating of this known tufted carpet takes the form of precoating with suitable known latices, followed either directly by lamination with a second backing or, after intermediate drying, by the main coating, preferably a coating with a foamed latex. The coatings used for this purpose likewise contain flame-resistant or flame-retardant substances in the necessary amount. This known material with its multilayered backing, the large amount of coating and the necessary amount of flame retardant additives not only is complicated to produce but also has a high basis weight and, because of its zirconium content, is problematical to dispose of.

The present invention relates to a low flammability carpet floor covering of high utility due to excellent dimensional stability, high tuft anchorage and advantageous hand. Compared with wool carpet floor coverings used heretofore, the carpet floor covering of the invention has longer use times due to soil resistance and ease of cleaning and hence longer replacement times, a weight saving per $m^2$ of about 0.5 to 0.7 $kg/m^2$ over flameproofed wool carpets, high abrasion resistance, high lightfastness due to the use of appropriate dyes and dyeing standards, and good wet and dry rub fastness. When it is time to replace the carpet floor covering there are no problems (toxicity) in the disposal of the used carpet and incineration is possible in waste incinerators without problematical smoke generation.

The low flammability carpet floor covering of the invention comprises a backing material, a tied-in pile yarn and a back finish and in it the pile yarn comprises low flammability synthetic fibers, the backing material comprises normal or low flammability synthetic fibers, and the back finish comprises a polyurethane composed of the building blocks of the formulae I to VII:

where

A1 is an aliphatic radical having from 2 to 12, preferably 4–10, in particular 4–8, carbon atoms, A2 is a phenyl radical, preferably an o-, m- or p-phenyl radical, A3 is an aliphatic radical having 2–10, preferably 4–8, carbon atoms, with n and m each being 1 or 2 and n+m being 3 or 4, preferably 3, and each of the n oxygen atoms being attached to A3, B1 is an aliphatic or cycloaliphatic radical having 2–10, preferably 4–8, carbon atoms, B2 is an aliphatic or cycloaliphatic radical having 3–6 carbon atoms, preferably an aliphatic radical having 3 or 4 carbon atoms with p being 1 or 2 and each of the p oxygen atoms being attached to B2, C1 is an aliphatic or mono- or bicyclic cycloaliphatic radical having from 2 to 12 carbon atoms, preferably 5–12 carbon atoms, and D1 is an aliphatic or mono- or bicyclic cycloaliphatic radical having from 5 to 36 carbon atoms, preferably 6–20, in particular 10–16, carbon atoms, the proportions of the radicals I to III, based on their total amount, are within the following limits:

I: 40 to 80 mol %, preferably 50 to 70 mol %,

II: 10 to 40 mol %, preferably 15 to 35 mol %,

III: 0 to 25 mol %, preferably 10 to 20 mol %, the proportions of the radicals IV, V and VI, based on their total amount, are within the following limits:

IV: 65 to 95 mol %, preferably 75 to 95 mol %

V: 0 to 19 mol %, preferably 0 to 5 mol %,

VI: 3 to 16 mol %, preferably 4.5 to 10 mol % the radicals of the formulae I, II and IV are polyester blocks having an average molecular weight of from 400 to 6000 and the proportions of the radicals of the formula VII, based on the total amount of all the components of the polyurethane resin, are from 5 to 35 mol %, preferably from 10 to 25 mol %.

Particular preference for the back finish of the carpet of the invention is given to polyurethane resins wherein the proportions of the radicals I, II and IV, based on their total amount, are within the following limits:

I: 25–35 mol %

II: 10–20 mol %

III: 45–65 mol %

The carboxyl groups of the building blocks of the formula III are not involved in forming the polyester, but, after incorporation into the polyurethane resin, are partly or wholly neutralized with organic or inorganic bases, preferably with amines, for example trimethylamine, triethylamine, dimethylethanolamine, dimethylisopropanolamine or dimethylaminopropanol, or with alkali metal hydroxides.

The building blocks of the formulae I–VII are derived from known monomer building blocks which are cocondensed into the polyurethane. Building blocks of the formula I are derived for example from succinic acid, glutaric acid, adipic acid, azelaic acid or sebacic acid; building blocks of the formula II are derived for example from phthalic acid and in particular from terephthalic acid or isophthalic acid;

Building blocks of the formula III are derived for example from dihydroxymonocarboxylic acids such as α- or β-methylglyceric acid, α-propyl- or isopropyl-glyceric acid, α-ethyl-β-methylglyceric acid, β,γ-dihydroxybutyric acid, α,α-bishydroxymethylpropionic acid or hydroxydicarboxylic acids such as malic acid, α- and β-methylmalic acid, α,β-dimethylmalic acid, β-ethylmalic acid, α,β-methylethylmalic acid, α-isopropylmalic acid.

Building blocks of the formula IV are derived for example from ethylene glycol, 1,4-butanediol, cyclohexanedimethanol or 1,6-hexanediol;

building blocks of the formula V are derived for example from glycerol, trimethylolpropane or pentaerythritol; building blocks of the formula VI are derived for example from ethylenediamine, hexamethylenediamine, 1-amino-3-aminomethyl-3,5,5-trimethylcyclohexane (isophoronediamine);

building blocks of the formula VII are derived for example from 1,6-diisocyanatohexane, 3,5,5-trimethyl-1-isocyanato-3-isocyanatomethylcyclohexane, 4,4'-diisocyanatodicyclohexylmethane.

The polyurethanes to be used according to the invention preferably have no free isocyanate groups. Polyurethanes having an analogous structure and the preparation thereof are known from European Patent Specification No. 0 073 517. There these products are used for preparing solvent-resistant coatings for wood, paper, metal, mineral substrates, plastics and glass. There is no mention of the use according to the present invention. Polyurethane resins preferred for the use according to the present invention are obtained by advantageously first preparing an OH-functional polyester from building blocks of the formulae I, II, IV and optionally V, with an average molecular weight ($\overline{M}_n$) of about 400 to 6000, preferably 900 to 2500, and an OH number of 18 to 280, preferably from 44 to 125, and reacting it with a polyhydroxycarboxylic acid, to derive the building block III, and a diisocyanato compound, to derive the building block VII, at temperatures of from room temperature to about 100° C. in an aprotic polar solvent to form a prepolymer having carboxyl groups and terminal isocyanate groups.

The carboxyl groups of this prepolymer are then at least partly neutralized, for example with an alkali metal hydroxide or preferably with an amine. The intermediate product thus obtained is transferred to a predominantly aqueous phase and the isocyanate groups still present are reacted with a diamine chain extender to form the corresponding urea groups. In this way the polyurethane to be used according to the present invention is obtained directly in the form of a finely divided, stable polyurethane dispersion.

Synthetic fibers for the purposes of this invention are continuous filament or staple fibers in a flat or textured state. The staple length of stable fibers is advantageously 25 to 200 mm, preferably 120 to 150 mm.

Texturing can have been carried out by any known method, in particular by stuffer box crimping, by false twist texturing or on the basis of self-crimping fiber properties.

As mentioned earlier, in the case of woven and Raschel warp-knitted carpets the backing can take the form of a ground warp-filling construction and in the case of tufted carpets and needlefelt constructions the backing can be incorporated into the gross structure as an independent woven, spunbonded or web product.

The weight proportions of pile material, backing and finish in the low flammability carpet floor covering of the invention are about 700 to 1300 g/m$^2$ of pile material, 80 to 250 g/m$^2$ of backing and 150 to 500 g/m$^2$, preferably 200 to 300 g/m$^2$, of polyurethane finish. If the backing is a woven fabric or a weave-analogous construct, it advantageously has about 60 to 150 warp threads and 80 to 165 filling threads per 10 cm. Other backing constructions preferably have a corresponding thread density.

The pile material advantageously comprises staple or continuous filament fiber yarns having counts of Nm 0.5 to Nm 25, preferably Nm 4 to Nm 10. The yarns contain continuous filament or staple fibers. Said staple fibers have a linear density of from 1 to 30 dtex and a staple length of from 25 to 200 mm. In the case of continuous filament yarns the yarn count or yarn linear density is in the same range as for staple fiber yarns. The filament linear density of the continuous filament yarns is within the range from 1 to 30 dtex, preferably from 5 to 15 dtex.

A woven or knitted backing comprises staple or continuous filament fiber yarns having counts of from Nm 6 to Nm 20, preferably Nm 12 to Nm 14. The staple fiber yarns are made of staple fibers having a linear density of from 6 to 17 dtex and a staple length of from 80 to 150 mm. In the case of continuous filament yarns the yarn count or yarn linear density is in the same range as for staple fiber yarns. The filament linear density of the continuous filament yarns is within the range from 3 to 30 dtex, preferably from 5 to 15 dtex.

Whereas the pile yarn of the low flammability carpet floor covering of the invention always comprises synthetic fibers which have been modified to be flame retardant, preferably polyester fibers which have been modified to be flame retardant, the backing can alternatively also comprise other, normal flammability thermoplastic synthetic fiber materials, for example unmodified polyethylene terephthalate or modified polyethylene terephthalate, comprising for example polyethylene terephthalate which has been modified with polyethylene glycol or comprising polybutylene terephthalate.

The preferred normal flammability thermoplastic synthetic fiber material is unmodified polyethylene terephthalate.

The yarns used for the backing, but also those used for the pile, may in addition to the optionally flame-retardant-modified polyester fibers mentioned also comprise fibers of no or less flame resistance, as long as the required low flammability of the carpet floor covering as a whole is not impaired. These additional fibers can be used in particular when they confer additional advantageous properties on the carpet floor covering, for example an antistatic effect.

If the backing of the low flammability carpet floor covering of the invention comprises normal thermoplastic synthetic fibers which have not been modified to be flame retardant, it conveniently and preferably has the structure of a web, in particular of a spunbonded web. Particular preference is given to carpets according to the invention where the yarns of the backing too comprise low flammability polyesters.

The low flammability thermoplastic synthetic fiber material of which the pile yarns and optionally also the backing yarns of the low flammability carpet floor covering of the invention are composed preferably likewise comprises polyester. In principle any type of polyester known for fibermaking is suitable. Suitable polyesters of this type predominantly comprise building blocks derived from aromatic dicarboxylic acids and from aliphatic diols. Widely used aromatic dicarboxylic acid building blocks are the bivalent radicals of benzene-dicarboxylic acids, in particular of terephthalic acid and of isophthalic acid, widely used diols have 2–4 carbon atoms, and ethylene glycol is particularly suitable.

The low flammability of the polyester material is obtained through additions of halogen compounds, in particular bromine compounds, or, particularly advantageously, by means of phosphorus compounds cocondensed into the polyester chain.

Particular preference is given to low flammability pile or else backing yarns made of polyesters, in particular those mentioned above, which contain, cocondensed in the chain, building blocks of the formula

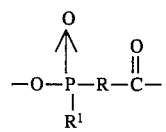
(VIII)

where R is alkylene or polymethylene having 2 to 6 carbon atoms or phenyl and $R^1$ is alkyl having 1 to 6 carbon atoms, aryl or aralkyl.

Preferably, in the formula VIII, R is ethylene and $R^1$ is methyl, ethyl, phenyl or o-, m- or p-methylphenyl, in particular methyl.

The amount of flame retardant of the formula VIII added to the fiber raw material is from 0.1 to 20% by weight, preferably from 2.5 to 12% by weight, based on the total weight of the fibers or filaments.

Of particular advantage are carpets according to the invention whose fibers comprise a polyester material which is at least 85 mol % polyethylene terephthalate. The remaining at most 15 mol % are made up of the above-mentioned flame retardant comonomers of the formula VIII and optionally dicarboxylic acid units and glycol units which act as modifiers and make it possible for the skilled person to control the physical and chemical properties of the resulting filaments in a specific manner. Examples of such dicarboxylic acid units are radicals of isophthalic acid or of aliphatic dicarboxylic acids such as glutaric acid, adipic acid and sebacic acid; examples of modifying diol radicals are radicals of longer-chained diols, for example of propanediol or butanediol, of di- or triethylene glycol or, if present in a small amount, of polyglycol having a molecular weight of about 500–2000.

The polyesters present in the yarns of the carpets according to the invention preferably have a molecular weight corresponding to an intrinsic viscosity (IV) measured in a solution of 1 g of polymer in 100 ml of dichloroacetic acid at 25° C., of from 0.7 to 1.4.

A particularly preferred low flammability polyester which can be used with particular advantage for producing the pile and optionally also the backing yarns of the low flammability carpet floor covering of the invention is a fiber material of the type Trevira CS from Hoechst AG.

Of particular importance for the low flammability is the proportion of the basis weight of the low flammability carpet floor covering of the invention accounted .for by the polyurethane finish. Within the above-specified limits of from 150 to 500 g/m², preferably 200 to 300 g/m², the amount of polyurethane applied is preferably such in an individual case that in the plane of the backing thorough impregnation of the fibers and filling of the fiber interstices can take place. An excessive application, which leads to the formation of a pure polyurethane layer, should preferebly be avoided. A pure polyurethane layer is a layer which has a plane parallel to the plane of the carpet floor covering which is not traversed by fibers of the carpet backing.

By way of example, the accompanying drawing shows an illustrative sketch of the structure of a carpet according to the invention, comprising the backing yarns (1), the pile yarns (2) looped round the backing yarns, and the polyurethane back finish (3).

What is particularly surprising is that the carpet floor covering of the invention is of extremely low flammability even when the backing does not comprise a flame retardant synthetic fiber material, in particular a flame retardant polyester, and even though the polyurethane used as back finish does not contain any flame retardant additives or modifiers. This surprising effect of a flame retardant finish conferred by the above-defined polyurethane is also obtained on other textile sheet materials.

The present invention therefore further provides the use of the above-defined polyurethane as a finish in the production of low flammability textile materials made of thermoplastic synthetic fibers and also an aqueous finish for producing low flammability textile materials made of thermoplastic synthetic fibers, comprising 20–60% by weight of the above-defined polyurethane resin 3–15% by weight of an aprotic, water-soluble, linear or cyclic carboxamide derived from a carboxylic acid having a chain length of from 1 to 5 carbon atoms, and 37–77% by weight of water.

Preferably the finish comprises

30–55% by weight of the polyurethane resin,

5–10% by weight of the aprotic, water-soluble, linear or cyclic carboxamide, and 40–65% by weight of water.

Examples of aprotic, linear or cyclic amides which can be present in the abovementioned finishes are dimethylformamide, dimethylacetamide and preferably N-methylpyrrolidone. In addition the textile finish of the invention may contain customary additives, such as thickeners, antimigration agents, emulsion stabilizers, fillers or pigments or the like, in a proportion of up to 15, preferably up to 10, % by weight of the total mixture.

When the polyurethane finish of the invention is used for producing low flammability textile materials from thermoplastic synthetic fibers, it is advantageously applied in amounts of from 5 to 100 g/m$^2$, preferably from 10 to 50 g/m$^2$.

The present invention also provides a process for producing a low flammability carpet floor covering by first using one of the known knotting, weaving, warp-knitting or tufting processes to produce an unsupported carpet floor covering comprising a backing and tied-in pile yarns, dyeing as usual, optionally cutting the pile, then washing to remove existing spin finishes, and then applying a finish from the back by spraying, brushing, knife-coating or foaming, with or without the addition of a foamer to the finish, but preferably by kiss roll padding, which comprises applying a back finish that is a polyurethane preparation of the following composition:

20–60% by weight of the above-defined polyurethane resin,

3–15% by weight of an aprotic, water-soluble, linear or cyclic carboxamide based on a carboxylic acid having a chain length of from I to 5 carbon atoms, and 37–77% by weight of water.

Preferably the finish comprises

30–55% by weight of the polyurethane resin,

5–10% by weight of the aprotic, water-soluble, linear or cyclic carboxamide, and 40–65% by weight of water, and, after this back finish has been applied, drying the carpet at temperatures of from 80° to 180° C., preferably from 120° to 150° C.

The viscosity of the finish is set in such a way as to achieve good penetration of the carpet backing. In general this is achieved when, for example for application by knife-coating, the viscosity of the finish is within the range from 5000 to 10000 mPa·s at the working temperature. The polymer finish is normally applied at temperatures from +5° to +40° C., preferably at room temperature.

Preferably, as mentioned earlier, the amount of polyurethane finish applied is determined in such a way that in the plane of the backing thorough impregnation of the fibers and filling of the fiber interstices with the polyurethane can take place, but not enough to lead to the formation of a pure polyurethane layer.

It is further preferable in the process of the invention for the material of which the carpet backing and in particular the pile is made to use yarns made of low flammability polyesters. Particular preference is given to the use of yarns made of the above-described polyesters, in particular of polyethylene terephthalate, which contain in the chain building blocks of the above-indicated formula VIII.

Embodiments of the invention will now be more particularly described to illustrate the production of a low flammability carpet floor covering according to the invention and the use of the polyurethane finish for producing a low flammability polyester fabric.

EXAMPLE 1

A tufted carpet comprising a needle-consolidated spun-bonded of unmodified polyethylene terephthalate filaments having a basis weight of 120 g/m$^2$ into which a pile yarn of low flammability polyethylene terephthalate (Trevira CS from Hoechst AG) has been inserted in such a way as to produce a pile height of 5.0 mm and the weight proportion of the raw tufted material accounted for by the pile fibers is 930 g/m$^2$, is thoroughly cleaned in a wash liquor at 80° C., removing with minimal residues all the spin finish present on the yarns. The carpet is then dried and kiss padded from the back with 650 g/m$^2$ of an aqueous dispersion (dry add-on 195 g/m$^2$) having the following composition:

30% by weight of polyurethane resin,

5% by weight of N-methylpyrrolidone,

65% by weight of water.

The polyurethane resin was prepared by first reacting an OH-functional polyester of adipic acid, isophthalic acid and 1,6-hexanediol having an average molecular weight of about 1300 and an OH number of 86, bishydroxymethylpropionic acid and 4,4-diisocyanatodicyclohexymethane at about 70° C. in N-methyl-2-pyrrolidone to form a prepolymer having carboxyl groups and terminal isocyanate groups. The carboxyl groups of this prepolymer were then partly neutralized with triethylamine, the resulting intermediate product was transferred to a predominantly aqueous phase, and the isocyanate groups still present were reacted with a diaminocyclohexane derivative chain extender to form the corresponding urea groups. The result was a finely divided, stable polyurethane dispersion.

After application of the finish the carpet was dried at 120° to 150° C.

The carpet thus produced meets not only the DIN 4102 requirements for low flammability building materials of Class B1 but also the aerospace industry requirements as represented by the Boeing test and the Airbus test ATS 1000.001 (described in "Airbus Industrie; Technical Specification, Fire Smoke Toxicity (FST), Test Specification).

EXAMPLE 2

A fabric woven from unmodified polyethylene terephthalate yarn in a cross twill construction and having a basis weight of 200 g/m$^2$ is thoroughly freed of spin finish in a wash liquor at 80° C. The fabric is then impregnated to saturation in an impregnator with the polyurethane dispersion specified in Example 1 and then squeezed off to a dispersion pickup of from 15 to 20% by weight, based on the weight of the dry textile material. The fabric thus treated is dried at from 120° to 150° C., curing the polyurethane to completion. The result is a stiffened textile sheet material which is highly useful for example for producing lamellae for horizontal and vertical Venetian blinds.

The material meets not only the DIN 4102 requirements for low flammability building materials of Class B1 but also the Aerospace industry requirements as represented by the Boeing test and the Airbus test ATS 1000.001.

What is claimed is:

1. A low flammability carpet floor covering comprising a backing material, a tied-in pile yarn, and a back finish, wherein the pile yarn comprises low flammability synthetic fibers, the backing material comprises normal or low flammability synthetic fibers, and the back finish comprises a polyurethane composed of the radicals of the formulae I to VII:

$$-CO-A1-CO- \qquad (I)$$

$$-CO-A2-CO- \qquad (II)$$

$$(-O-)_n-A3-(COOH)_m \qquad (III)$$

$$-O-B1-O- \qquad (IV)$$

$$-O-B_2-(O-)_p \qquad (V)$$

$$-NH-C1-NH- \qquad (VI)$$

$$-CO-NH-D1-NH-CO- \qquad (VII)$$

where

A1 is an aliphatic radical having from 2 to 12 carbon atoms,

A2 is a phenyl radical

A3 is an aliphatic radical having 2–10 carbon atoms, with n and m each being 1 or 2 and n+m being 3 or 4, and each of the n oxygen atoms being attached to A3, B1 is an aliphatic or cycloaliphatic radical having 2–10 carbon atoms, B2 is an aliphatic or cycloaliphatic radical having 3–6 carbon atoms with p being 1 or 2 and each of the p oxygen atoms being attached to B2, C1 is an aliphatic or mono- or bicyclic cycloaliphatic radical having from 2 to 12 carbon atoms, and D1 is an aliphatic or mono- or bicyclic cycloaliphatic radical having from 5 to 36 carbon atoms carbon atoms, the proportions of the radicals I to III, based on their total amount, are within the following limits:

I: 40 to 80 mol %,

II: 10 to 40 mol %,

III: 0 to 25 mol %, the proportions of the radicals IV, V and VI, based on their total amount, are within the following limits:

IV: 65 to 95 mol %,

V: 0 to 19 mol %,

VI: 3 to 16 mol %, the radicals of the formulae I, II and IV are polyester blocks having an average molecular weight ($\overline{M}_n$) of from 400 to 6000 and the proportions of the radicals of the formula VII, based on the total amount of all the components of the polyurethane resin, are from 5 to 35 mol %, and the weight proportions of polyurethane finish in the low flammability carpet floor covering is 150 to 500 g/m².

2. The low flammability carpet floor covering of claim 1, wherein the proportions of the radicals I to III, based on their total amount, are within the following limits:

I: 50 to 70 mol %

II: 15 to 35 mol %

III: 10 to 20 mol % and the proportions of the radicals IV, V and VI, based on their total amount, are within the following limits:

IV: 75 to 95 mol %

V: 0 to 5 mol %

VI: 4.5 to 10 mol %.

3. The low flammability carpet floor coveting of claim 1, wherein the weight proportions of pile material, backing and finish in the low flammability carpet floor coveting are about 700 to 1300 g/m² of pile material, 80 to 250 g/m² of backing and 200 to 300 g/m², of polyurethane finish.

4. The low flammability carpet floor covering of claim 1, wherein the backing has a thread density corresponding to about 60 to 150 warp threads and 80 to 165 filling threads per 10 cm.

5. The low flammability carpet floor covering of claim 1, wherein the backing comprises normal flammability thermoplastic synthetic fiber materials.

6. The low flammability carpet floor coveting of claim 1, wherein the backing comprises normal flammability thermoplastic synthetic fibers and has the structure of a spunbonded web.

7. The low flammability carpet floor covering of claim 1, wherein the yarns of the backing too comprise low flammability synthetic fibers.

8. The low flammability carpet floor covering of claim 1, wherein the low flammability of the synthetic fiber material is due to additions of halogen compounds or of phosphorus compounds.

9. The low flammability carpet floor covering of claim 1, wherein the synthetic fibers are polyester fibers.

10. The low flammability carpet floor covering of claim 9, wherein the polyesters contain, cocondensed in the chain, building blocks of the formula

where R is alkylene or polymethylene having from 2 to 6 carbon atoms or phenyl and R¹ is alkyl having from 1 to 6 carbon atoms, aryl or aralkyl.

* * * * *

UNITED STATES PATENT AND TRADEMARK OFFICE
CERTIFICATE OF CORRECTION

PATENT NO. : 5,486,398
DATED : Jan. 23, 1996
INVENTOR(S) : Manfred Weber et al

It is certified that error appears in the above-indentified patent and that said Letters Patent is hereby corrected as shown below:

Column 9, line 47 (claim 1, line 30), delete "carbon atoms" (first occurrence).

Column 10, line 21 (claim 3, line 1), change "coveting" to -- covering --.

Column 10, line 33 (claim 6, line 1), change "coveting" to -- covering --.

Signed and Sealed this

Twenty-first Day of May, 1996

Attest:

BRUCE LEHMAN

*Attesting Officer*        *Commissioner of Patents and Trademarks*